US011721340B2

(12) United States Patent
Chen et al.

(10) Patent No.: US 11,721,340 B2
(45) Date of Patent: *Aug. 8, 2023

(54) PERSONAL INFORMATION ASSISTANT COMPUTING SYSTEM

(71) Applicant: Allstate Insurance Company, Northbrook, IL (US)

(72) Inventors: Tao Chen, Northbrook, IL (US); Philip Peter Ramirez, Arlington Heights, IL (US); Manjunath Rao, Wheeling, IL (US)

(73) Assignee: Allstate Insurance Company, Northbrook, IL (US)

( * ) Notice: Subject to any disclaimer, the term of this patent is extended or adjusted under 35 U.S.C. 154(b) by 352 days.

This patent is subject to a terminal disclaimer.

(21) Appl. No.: 17/075,195

(22) Filed: Oct. 20, 2020

(65) Prior Publication Data

US 2021/0035582 A1 Feb. 4, 2021

Related U.S. Application Data

(63) Continuation of application No. 16/502,087, filed on Jul. 3, 2019, now Pat. No. 10,854,203, which is a (Continued)

(51) Int. Cl.
*G10L 15/22* (2006.01)
*G06F 21/62* (2013.01)
*G10L 15/18* (2013.01)

(52) U.S. Cl.
CPC .......... *G10L 15/22* (2013.01); *G06F 21/6263* (2013.01); *G10L 15/1822* (2013.01)

(58) Field of Classification Search
CPC .. G10L 15/22; G10L 15/1822; G06F 21/6263
See application file for complete search history.

(56) References Cited

U.S. PATENT DOCUMENTS 6,643,622 B2    11/2003   Stuart et al.
6,988,088 B1    1/2006    Miikkulainen et al.
(Continued)

FOREIGN PATENT DOCUMENTS

WO    2003073417 A2    9/2003

OTHER PUBLICATIONS

Feb. 28, 2018—U.S. Non-Final Office Action—U.S. Appl. No. 15/270,414.

(Continued)

*Primary Examiner* — Kevin Ky
(74) *Attorney, Agent, or Firm* — Dinsmore & Shohl LLP

(57) ABSTRACT

A personal information assistant computing system may include a user computing device having a processor and a non-transitory memory device storing instructions. The personal information assistant may receive a user accessible input as a natural language communication from the user, which may be analyzed by a personal information assistant to determine a task to be performed by the virtual information assistant. The personal information assistant may be personalized to the user using encrypted user information. The personal information assistant communicates with a remote computing system in performance of a computer-assisted task, wherein the first personal information assistant interacts as a proxy for the user in response to at least one response received from the remote computing system. The personal information assistant may communicate the results of the task to the user via a user information screen and/or an audio device.

20 Claims, 10 Drawing Sheets

Related U.S. Application Data continuation of application No. 15/270,414, filed on Sep. 20, 2016, now Pat. No. 10,395,652.

(56) References Cited

U.S. PATENT DOCUMENTS

| | | | |
|---|---|---|---|
| 8,510,707 B1* | 8/2013 | Heuler | G06F 8/10 |
| | | | 717/106 |
| 9,270,670 B1* | 2/2016 | Fitzgerald | G06F 21/45 |
| 10,854,203 B2* | 12/2020 | Chen | G10L 15/22 |
| 2003/0167167 A1 | 9/2003 | Gong | |
| 2006/0010217 A1 | 1/2006 | Sood | |
| 2008/0147441 A1 | 6/2008 | Kil | |
| 2010/0205658 A1* | 8/2010 | Griffin | G06F 21/32 |
| | | | 726/5 |
| 2012/0203798 A1* | 8/2012 | Gifford | G16H 10/60 |
| | | | 707/783 |
| 2012/0246102 A1 | 9/2012 | Sudharsan | |
| 2013/0031476 A1 | 1/2013 | Coin et al. | |
| 2013/0063357 A1* | 3/2013 | Lee | G06F 3/0233 |
| | | | 345/168 |
| 2013/0152092 A1 | 6/2013 | Yadgar | |
| 2014/0026194 A1* | 1/2014 | Smith | G06F 21/6245 |
| | | | 726/4 |
| 2014/0173401 A1* | 6/2014 | Oshlag | G06F 40/18 |
| | | | 715/212 |
| 2014/0201624 A1* | 7/2014 | Clark | G06F 40/186 |
| | | | 715/243 |
| 2015/0046196 A1* | 2/2015 | Tran | G06Q 10/10 |
| | | | 705/4 |
| 2015/0161521 A1* | 6/2015 | Shah | G06F 3/0481 |
| | | | 715/705 |
| 2015/0221043 A1* | 8/2015 | Chithambaram | G06F 40/40 |
| | | | 715/703 |
| 2015/0348551 A1* | 12/2015 | Gruber | G10L 15/1822 |
| | | | 704/235 |
| 2015/0381931 A1* | 12/2015 | Uh | G06F 3/0481 |
| | | | 348/14.03 |
| 2016/0117593 A1 | 4/2016 | London | |
| 2016/0179787 A1* | 6/2016 | Deleeuw | G10L 15/22 |
| | | | 704/9 |
| 2016/0180150 A1* | 6/2016 | Negi | G06V 40/45 |
| | | | 382/118 |
| 2016/0203002 A1* | 7/2016 | Kannan | G10L 15/1822 |
| | | | 715/708 |
| 2016/0335316 A1* | 11/2016 | Riva | G06F 11/3072 |
| 2017/0132199 A1* | 5/2017 | Vescovi | G06Q 10/06311 |
| 2017/0353392 A1* | 12/2017 | Nandi | H04L 63/104 |
| 2021/0035582 A1* | 2/2021 | Chen | G06F 21/6263 |

OTHER PUBLICATIONS

Jul. 9, 2018—(CA) Office Action—App 2,979,627.
Oct. 11, 2018—U.S. Final Office Action—U.S. Appl. No. 15/270,414.
Apr. 3, 2019—U.S. Notice of Allowance—U.S. Appl. No. 15/270,414.
Jun. 25, 2019—(CA) Office Action—Application No. 2,979,627.
Sep. 5, 2019—U.S. Non-Final Office Action—U.S. Appl. No. 16/502,087.
Mar. 9, 2020—U.S. Final Office Action—U.S. Appl. No. 16/502,087.
Jun. 29, 2020—(CA) Office Action—App. No. 2,979,627.
Jul. 20, 2020—U.S. Notice of Allowance—U.S. Appl. No. 16/502,087.

* cited by examiner

FIG. 11

PERSONAL INFORMATION ASSISTANT COMPUTING SYSTEM

CROSS-REFERENCE TO RELATED APPLICATIONS

This application is a continuation of and claims priority to U.S. patent application Ser. No. 16/502,087, filed Jul. 3, 2019, and entitled "Personal Information Assistant Computing System," which is a continuation of and claims priority to U.S. application Ser. No. 15/270,414, filed Sep. 20, 2016, and entitled "Personal Information Assistant Computing System," each of which is incorporated hereby by reference in its entirety.

FIELD OF THE DISCLOSURE

Aspects of the disclosure generally relate to methods and computer systems, including a personal information assistant computing system. More particularly, aspects of this disclosure provide a personal information assistant computing system for processing requests received from a user using a natural language interface and adaptive learning to perform tasks as a digital proxy of the user and securely managing access to the user's information.

BACKGROUND

Before the proliferation of computers and computerized devices, an individual would likely directly interact with businesses to exchange goods and/or services for money through various interfaces requiring some sort of physical interaction, such as face-to-face conversation, a phone conversation, communications sent via mail, and/or the like. While individuals and/or businesses may individually own computers to facilitate their individual activities, these computers or computer systems would likely not interact. In the current digital era, consumers and business organizations may interact using various computing devices (e.g., personal computers, business computing systems, smart phones, tablet computers, laptop computers, and the like) via one or more networks (e.g., the Internet, a telecommunications network, a cable network, a local area network, a wide area network, a proprietary business network, etc.).

During these digital interactions, business organization may monitor and/or collect information corresponding to the consumer and/or the consumer interactions. The business organizations may create products and/or services based on the collected information. However, the consumer has limited options for securing and/or organizing their own information and controlling how this information can be shared with the business organizations. As such, a need has been recognized for systems and/or methods that allow a user to organize, secure, and/or control sharing of their information during digital interactions with business organizations and/or automated consumer systems.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to a personal information assistant computing system may include a user computing device having a processor and a non-transitory memory device storing instructions. The personal information assistant may receive a user accessible input as a natural language communication from the user, which may be analyzed by a personal information assistant to determine a task to be performed by the virtual information assistant. The personal information assistant may be personalized to the user using encrypted user information. The personal information assistant communicates with a remote computing system in performance of a computer-assisted task, wherein the first personal information assistant interacts as a proxy for the user in response to at least one response received from the remote computing system. The personal information assistant may communicate the results of the task to the user via a user information screen and/or an audio device.

BRIEF DESCRIPTION OF THE DRAWINGS

The present invention is illustrated by way of example and is not limited in the accompanying figures in which like reference numerals indicate similar elements and in which:

FIG. 11 shows illustrative user interface screens as a personal information assistant simplifies user verification of information according to one or more aspects of the invention.

DETAILED DESCRIPTION

Figure 1:
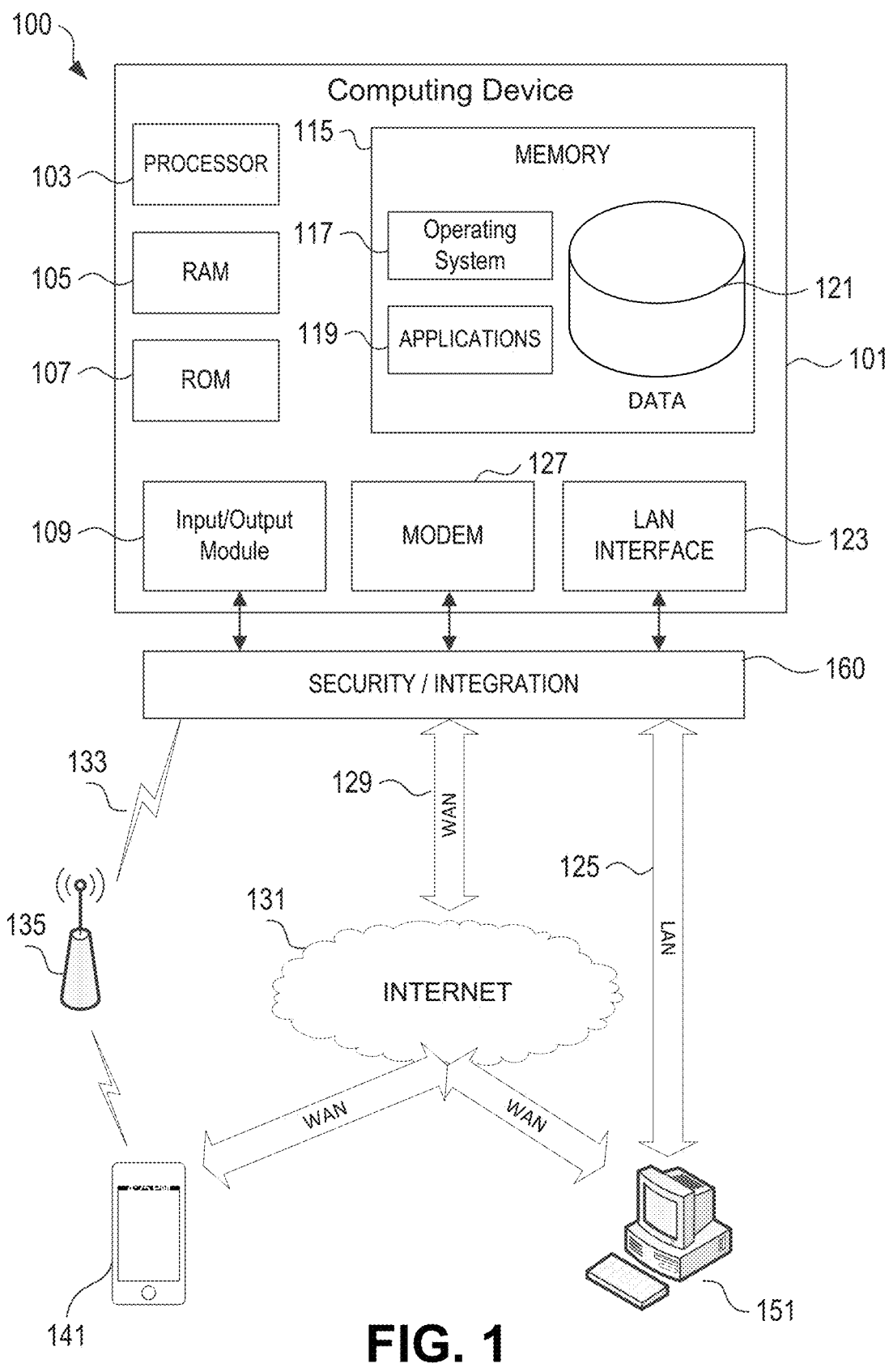
FIG. 1 is a block diagram of an illustrative computing device that may be used according to one or more aspects of the disclosure.

In accordance with various aspects of the disclosure, methods, computer-readable media, software, and apparatuses are disclosed that provide an intelligent digital information assistant to allow a user to effortlessly and securely control use of their personal information in an increasingly digital world. As discussed above, user information may be available to business organizations as part of digital interactions via the Internet or other networks. Such user information may include any information associated with the user, email information, telephone information, including personally identifiable information (e.g., name information, address information, driver's license number, passport number, government identification number, social security number, vehicle registration information, a vehicle identification number, credit card information, financial account information, digital account information, digital identity information, medical information, genetic information, login name information, password information, employment information, etc.), online identity information (e.g., social network information such as a screen name, password, etc.), product information (e.g., purchased product information such as a serial number, model number, purchase date, purchase price, and the like), personal relationship information (e.g., relationship type information such as friend, family, and the like, name information, contact information, birthdays, anniversaries, gift preference information, etc.), business relationship information (e.g., business relationship type such as vendor, supplier, manufacturer, customer, client and the like, contact information, scheduled call information, order information, and the like), etc. In some cases, the personal information may include one or more user preferences, as will be discussed below. For example, a user preference may correspond to a particular user interaction or transaction (e.g., a maximum price the user is willing to pay for a product or service during a negotiation, etc.), a subset of interactions with the personal information assistant (e.g., allow the personal information assistant to automatically initiate contact with certain systems, such as by initiating contact with a technical support computing system associated with a particular user account when an account problem is identified, etc.), or all user interactions (e.g., a user may prefer to interact with the personal information assistant via voice interface, a text interface and/or the like.).

As part of the digital interactions, the business organizations may monitor and/or collect information corresponding to the consumer and/or the consumer interactions. The business organizations may then use at least a portion of the collected information to create and/or improve their products and/or services. However, the consumer has limited options for securing and/or organizing their own information and controlling how this information can be shared with the business organizations. Because of the limited options to control and/or secure access to their information, the consumers are exposed to risk of identity fraud as fraudsters may obtain enough information to make fraudulent applications that are substantially similar to those of a genuine party. Additionally, as fraudsters increasingly use stolen genuine identities, rather than fictitious identities, to bypass verification checks. As such, this use of genuine consumer identity data makes identity fraud increasingly difficult to spot from genuine applications.

A flaw has been recognized in managing consumer data in that much of a consumer's personal information electronically transferred while obtaining a new product and/or new service is not verified at the time the data is electronically communicated via a network, such as via an Internet website. For example, the Internet is open to a number of vulnerabilities, such as malware and/or spoofed websites for which a story may be developed such that the malware and/or spoofed websites appear genuine. In doing so, a fraudster may perform research to identify and/or target vulnerable individuals. As a result, an individual's personal data may be compromised via a phishing attack, a vishing attack (e.g., a phishing attack performed via a voice connection), malware, a data breach, or the like. Once compromised, the individual's personal information may be placed on-sale via one or more outlets. This data may be purchased by cyber-criminals to create accounts, purchase products and services, and/or the like. In some cases, the cyber-criminals may be able to compromise legitimate consumer accounts using this stolen information, leading to stolen money, compromised credit accounts, goods sent to a different address, and/or other fraudulent activities. However, according to aspects of this disclosure, the personal information assistant (e.g., a virtual information assistant, etc.) may be capable of not-only making an individual's electronic activities easier and more efficient, but also may be used to provide a secure and encrypted method of communicating consumer information to providers of goods and services via a network, such as the Internet, call centers, telecommunication networks, cable networks, and the like.

In the following description of the various embodiments, reference is made to the accompanying drawings, which form a part hereof, and in which is shown by way of illustration, various embodiments of the disclosure that may be practiced. It is to be understood that other embodiments may be utilized.

Various aspects described herein may be embodied as a method, an apparatus, a system, or a computer readable medium. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates a block diagram of a computing device 101 in a multi-dimensional risk score generation system 100 that may be used according to one or more illustrative embodiments of the disclosure. The computing device 101 may have a processor 103 for controlling overall operation of the computing device 101 and its associated components, including RAM 105, ROM 107, input/output module 109, and memory unit 115. The computing device 101, along with one or more additional devices (e.g., terminals 141, 151) may correspond to any of multiple systems or devices, such as multi-dimensional risk score generation computing devices or systems, configured as described herein for receiving data from various sources and generating one or more multi-dimensional risk scores.

The input/output (I/O) module 109 may include a microphone, keypad, touch screen, and/or stylus through which a user of the computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the computing device 101 to execute a series of computer-readable instructions to receive data from various sources and generate one or more multi-dimensional risk scores.

The computing device 101 may operate in a networked environment 100 supporting connections to one or more remote computers, such as terminals/devices 141 and 151. Multi-dimensional risk score generation computing device 101, and related terminals/devices 141 and 151, may include devices installed in vehicles, mobile devices that may travel within vehicles, or devices outside of vehicles that are configured to receive and process vehicle and other sensor data. Thus, the computing device 101 and terminals/devices 141 and 151 may each include personal computers (e.g., laptop, desktop, or tablet computers), servers (e.g., web servers, database servers), vehicle-based devices (e.g., onboard vehicle computers, short-range vehicle communication systems, sensors and telematics devices), or mobile communication devices (e.g., mobile phones, portable computing devices, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle sensing and telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and multi-dimensional risk score generation system components described herein may be configured to communicate using any of these network protocols or technologies.

Additionally, one or more application programs 119 used by the computing device 101 may include computer executable instructions (e.g., multi-dimensional risk score generation, and the like) for receiving data and performing other related functions as described herein.

Figure 2:
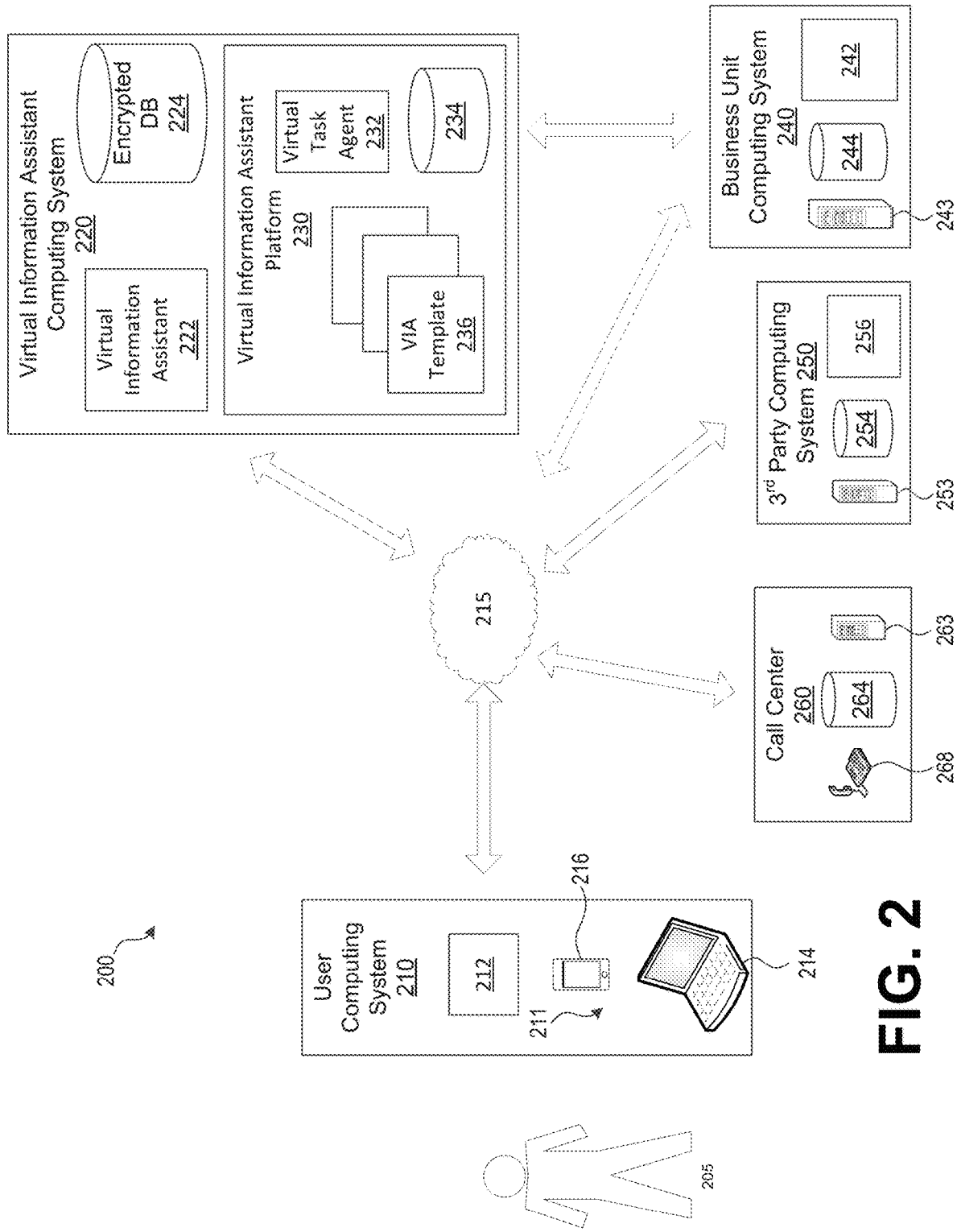
FIG. 2 shows a block diagram representation of an illustrative personal information assistant computing system according to one or more aspects of the disclosure.

FIG. 2 shows a block diagram representation of an illustrative assistant computing system 200 according to one or more aspects of the disclosure. The computing system 200 may include a user computing system 210 that may be communicatively coupled to one or more remote computing systems via a network 215. The user computing system 210 may include one or more user devices 211 (e.g., a tablet computer, a smart phone 216, a laptop computer 214, a desktop computer, a smart watch, and/or the like) may include a personal information assistant 212 for providing a virtual information assistance service to a user 205. In some cases, the user computing system may be communicatively coupled to one or more remote computing networks via a wired and/or wireless link to a network 215, such as the Internet, a telecommunications network, a cable network, a telephone network, and/or the like. In some cases, the remote computing systems may include one or more computing systems associated with one or more business organizations, governmental organizations, nonprofit organizations, educational organizations, and/or the like. In the illustrative example of FIG. 2, these computing systems may include one or more computing systems associated with a business organization providing the personal information assistant service to the user 205. For example, the business organization may provide one or more computing devices configured as a personal information assistant computing system 220 to provide one or more aspects of the personal information assistant service to the user 205. The business organization may also include one or more business unit computing systems that may be configured to provide one or more business functions (e.g., a product sales computing system, a service provider computing system, a customer support computing system, etc.), such as to facilitate providing products and/or services to the user 205 via the network 215. In some cases, the business unit computing system 240 may be communicatively coupled to the network 215 directly and/or via the personal information assistant computing system 220 via a wired or wireless communication links. Additionally, the user 205 and the personal information assistant 212 may interact with one or more business organizations additional to the provider of the personal information assistant service, such as via the third party computing system 250, the call center 260, and/or other network connected (e.g., Internet connected computing systems, cellular network connected systems, telephone network systems, cable network connected, etc.) systems.

In some cases, an organization (e.g., a business organization, governmental organization, educational organization, a financial institution, etc.) may provide one or more computing systems to provide products and/or services to their customers or prospective customers. For example, an insurance provider may have one or more computing systems (e.g., the business unit computing system 240 for providing different products or services to their customers, such as an insurance quotation computing system, an insurance claim processing system, a customer service computing system, a technical support computing system, a call center computing system, and/or the like. The business unit computing system may include one or more computing devices 243 (e.g., servers, routers, user interface devices, telephone systems, internet telephony computing device, and/or the like) to store and/or retrieve data in one or more data stores 244 by processing instructions 246 that cause the computing devices 243 to provide a web interface to the user 205 via the network 215, display a user interface to a business representative, process information received from the user 205 to provide a quotation for a product and/or service and/or to provide the product and/or service to the user 205. Similarly, the user 205 may use one or more user devices 211 to access the call center system 260 that may include one or more telephone systems 268, computing devices 263 to process instructions to provide user interface screens, phone system functionality, etc., data stores 264 and/or the like. The user 204 may also use the one or more user devices 211 to access via the network 215 the $3^{rd}$ party computing system 250 that may include one or more computing devices 253, one or more data stores 254 configured to process instructions 256 to provide a web interface to the user and/or a human representative of the $3^{rd}$ party organization, access and/or store data received from the user with respect to products and/or services provided by the $3^{rd}$ party organization and/or the like.

In some cases, an organization's computing systems may include the personal information assistant computing system 220, which may be communicatively coupled to the network 215 and/or one or more business unit computing systems 240. The PIA computing system may include one or more personal information assistant applications, such as the PIA 222, which may be associated with one or more users, such as the user 205. In some cases, the personal information assistant 222 may be identical to the PIA 212 of the user computing system, different than the PIA 212 (e.g., a different version of the PIA 212), include different functionality than the PIA 212, or may provide at least a portion of the functionality of the PIA 212. The PIA computing system 220 may include one or more encrypted data stores such as the encrypted database 224 which may securely store user information. The PIA computing system 220 may also include a personal information assistant platform 230 (e.g., a framework) that may be used to generate the personal information assistant 212, 222 and/or versions of the PIA 212, 222. the PIA platform 230 may include one or more PIA templates 236 that may correspond to personal information assistant functionality to support personal interactions with different computing systems, work-related interactions with different computing systems, securely handling personal information, and the like. In some cases, the personal information assistant platform 230 may include one or more virtual task agents 232 which may be configured to perform a specific task (e.g., securely complete forms with personal information, interact with specific computing systems such as performing technical support functionality, providing a specific business function, and the like). The PIA platform 230 may also include a data store 234 which may be used to store one or more of the PIA templates, one or more versions of a PIA, scrubbed and/or non-personal data without identifying information that may be used to develop and/or improve PIA functionality and the like.

The illustrative computing systems of FIG. 2 may be configured to provide and/or interact with a personal information assistant service, such as a personal information assistant (PIA) 212, 222. Each component shown in FIG. 2 may be implemented in hardware, software, or a combination of the two. Additionally, each component of the personal information assistant computing system 200 may include one or more computing devices (or computing systems) having some or all of the structural components described above with respect to computing device 101.

In some cases, the personal computing system 210 may include one or more computing devices 211, such as the smart phone 216, the laptop computer 214, or the like. These computing devices may include one or more instances of a virtual information assistant, such as a personal information assistant application 212. The user 205 may be able to communicate to the personal information assistant application 212 via one or more interfaces using natural language, keywords, text commands, and/or other methods of communicating information. In some cases, the personal information assistant application 212 may use one or more adaptive learning methods to learn preferences of the user 205 such that the personal information assistant application 212 may operate as a proxy (e.g., a "digital twin") of the user 205 when interacting with one or more remote business systems and may be configured to securely manage access to the customer's personal information. For example, the user 205 may instruct the personal information assistant application 212 to identify and/or receive quotations from one or more vendors to provide a desired product or service. In another illustrative example, the personal information assistant application 212 may be used to automate an activity (e.g., securely fill out a form) that may be at least a portion of a business interaction, such as by interacting with a computing system (e.g., the third-party computing system 250, etc.) and/or a human (e.g., a representative at the call center 260, etc.) via the network 215.

In some cases, the personal information assistant 212 operating as part of the user computing system 210 may be a stand-alone application, a link to a remote personal information assistant 222, or operate as a combination with a portion of the personal information assistant functionality being performed local to the user device and a portion of the PIA functionality being performed remotely by a component of the PIA computing system 220. In some cases, the user 205 may interact directly with a computing system (e.g., the call center system 260, the $3^{rd}$ party computing system 250, the business unit computing system 240, and/or the like) via the network 215 using one or more of the user devices 211. For example, the user 205 may utilize a wireframe interface (e.g., a web browser accessing a website, a dedicated computing program, an application (e.g., a software program, an "app", etc.) and/or the like to allow the user to interact with one or more different computing systems. Illustrative examples may include, a user may access an insurance provider website to request information and/or apply for an insurance policy, a website provided by a financial institution to access an account and/or apply for a loan, a website provided by a governmental institution to utilize a provided service and/or to initiate an electronic payment to pay a financial obligation In some cases, the user 205 may utilize a user interface device (e.g., a display device, a user interface screen, a keyboard, a microphone, an imaging device, a pointing device, etc.) to engage in electronic communications via the network 205 (e.g., a web interface, an internet phone interface, a text messaging interface, an email interface, etc.) with one or more remote computing systems, such as the business unit computing system 240, the $3^{rd}$ party computing system 250, the call center system 260, and the like. In an illustrative example, a user may access a wireframe interface (e.g., a web browser) using one or more of the user devices 211 to electronically communicate with one or more business computing systems. For example, the user 205 may use an application and/or a web browser installed on their smartphone 216 to electronically purchase a product or service from a business organization. In some cases, the user may communicate via email or text message (e.g., via an instant messaging feature of the smart phone or incorporated into a business website) to communicate to a human via the business computing system.

According to aspects of this disclosure, the user 205 may utilize 212 personal information assistant 212 installed on their smart phone 216 and/or computing device 214 to facilitate their interaction with the business computing system and/or with a business representative via the business computing system. In some cases, the personal information assistant service may be accessed via the personal information assistant 222 that may be partially, or completely, operating on the personal information assistant computing system 220. In some cases, the user 205 may use a natural language dialog to communicate with the one or more virtual information assistants 212, 222 to assist with work-related activities, personal life activities and/or the like. The virtual information assistants 212, 222 may be configured to work with and/or be integrated with one or more special skill digital agents (e.g., the virtual task agent 232) that may be configured to execute one or more application functions that perform work related tasks, personal life related tasks and the like to assist the user 205 in making the user's personal life experience and/or work life experience more efficient and secure.

As discussed below, the data transferred to and from various devices in the personal information assistant computing system 200 may include secure and sensitive data, such as personal identification information, personal financial information, telematics information, confidential work-related information, computer system login information, confidential vehicle operation data, insurance policy data, and the like. Therefore, in an illustrative example, it may be desirable to protect transmissions of such data by using secure network protocols and encryption, and also to protect the integrity of the data when stored on the various devices within a personalized insurance system, such as personal mobile devices, vehicle-based devices, insurance servers, external data source servers, or other computing devices in the personal information assistant computing system 200, such as by using a security and integration layer to authenticate users and restrict access to unknown or unauthorized users. In some cases, the security and integration layer may provide, for example, a file-based integration scheme or a service-based integration scheme for transmitting data between the various devices in the personal information assistant computing system 200. Data may be transmitted through the security and integration layer, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In some cases, one or more web services may be implemented within the various devices in the personal information assistant computing system 200 and/or the security and integration layer. The web services may be accessed by authorized external devices, computing systems, and users to support input, extraction, and manipulation of the data (e.g., personal information, work-related information, telematics information, financial information, insurance information, vehicle information, residence information, etc.) between the various devices and/or computing systems in the personal information assistant computing system 200. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, and/or driving trip data analysis web service, a risk unit based insurance policy determination or offer web service, or the like, may be implemented in the security and integration layer using the Secure Sockets Layer (SSL) or Transport Layer Security (TLS) protocol to provide secure connections between servers and/or various clients of the personal information assistant computing system 200. In some cases, SSL or TLS may use HTTP or HTTPS to provide authentication and confidentiality. In some cases, such web services may be implemented using the WS-Security standard, which provides for secure SOAP messages using XML encryption. In some cases, the security and integration layer may include specialized hardware for providing secure web services. For example, secure network appliances in the security and integration layer may include built-in features such as hardware-accelerated SSL and HTTPS, WS-Security, and firewalls. Such specialized hardware may be installed and configured in the security and integration layer in front of the web servers, so that any external devices may communicate directly with the specialized hardware.

Furthermore, with respect to authenticating users (e.g., the user 205) associated with the personal information assistant 212 and/or monitoring consumer and/or work-related information communicated in the personal information assistant computing system 200 with respect to a probability associated with a data breach associated with the user 205 based on an online presence of the user 205, the disclosures of the following patent applications are incorporated by reference herein in their entirety: U.S. patent application Ser. No. 14/991,042, filed Jan. 28, 2016, entitled "User Authentication Based on Probabilistic Inference of Threat Source" and U.S. patent application Ser. No. 15/150,955, filed May 10, 2016, entitled "Cyber-Security Presence Monitoring and Assessment."

In an illustrative example, the PIA 212 or PIA 222 may be a personal information assistant that may be customized or otherwise adapted to characteristics and/or preferences of the user 205 via a natural language interface based on one or more machine learning algorithms using knowledge learned about the user 205 via natural language interactions with the user, interactions with one or more computing systems and/or other personal information stored in an encrypted data store 224 in the business organization computing systems. For example, the PIA 212 or PIA 222 may be incorporated into a virtual information system platform 230 incorporated into the business organization's computing network and may be powered by one or more artificial intelligence algorithms (e.g., a neural network, fuzzy logic engine, etc.). Such machine learning algorithms may comprise a supervised learning algorithm or model (e.g., a logistic regression algorithm, a back propagation neural network model, etc.) that may be trained to a particular user or task and may make predictions (e.g., a model based prediction, etc.) that may be evaluated to determine whether corrections are necessary until a specified accuracy level has been reached. In some cases, an unsupervised learning algorithm or model (e.g., a clustering algorithm, a dimensionality reduction model, rule learning, etc.) may be used. In such cases, a model may be used that determines patterns and/or structures present in input data to extract rules about the data. The model may be regressive and/or recursive to reduce redundancy and/or may organize data based on a degree of similarity. In some cases, the machine learning algorithms may be a combination of supervised and unsupervised algorithms that may not only predict an outcome based on inputs received, but find patterns or other organizational structures within the input data.

Illustrative algorithms may include, but be limited to, regression algorithms such as ordinary least squares regression algorithms, linear regression, logistic regression algorithms, stepwise regression algorithms, multivariate adaptive regression splines, and the like. Such algorithms may be used to model relationships between variables, such as particular user information parameters received from the user 205 via the natural language interface that may be iteratively refined by measuring error in the output (e.g., predictions, etc.) of the model. In some cases, machine learning models may be used to model a process based on instances or illustrative examples of training data to build a representative database of information, such that input data may be compared to the model data to identify similarities and/or find a best match in determining a prediction. The stored data may be modified and/or updated during the process based on the received inputs and/or evaluated outputs from the model. Illustrative examples of such models may include a k-nearest neighbor model, a self-organizing map, a weighted learning algorithm and/or the like. Other algorithms may include decision tree algorithms, Bayesian algorithms (e.g., naïve Bayes algorithms, Gaussian naïve Bayes algorithms, etc.), clustering algorithms, association rule learning algorithms that may be used to identify associations in large multidimensional datasets such as apriori algorithms eclat algorithms, etc., artificial neural network algorithms, deep learning algorithms (e.g., deep Boltzman machine algorithms, convolutional neural networks, etc.), an/or other such algorithms such as natural language processing algorithms, graphical models and the like.

In many cases, the PIA 212 and PIA 222 may continuously learn characteristics and/or receive preferences from the user 205 via the natural language interface and securely store information learned from these user interactions in an encrypted, secure data store accessible only with approval input by the user 205 via a user interface, such as at one or more of the user devices 211. In an illustrative example, the PIA 212 may be configured to interact with the user 205 like a person, such as by exchanging natural language communications (e.g., textual input, visual input, scanned input, audio input, etc.) with the user 205 using one or more user interfaces, such as a user interface screen on the user devices 211. In some cases, one or more virtual task agents 232 may be configured to perform one or more "specialized skills" to automate one or more tasks for the user. These virtual task agents 232 may be configured to perform specialized tasks (e.g., form filling, technical support functions, customer service telephone system navigation, etc.) for multiple users, such as by associating an instance of a virtual task agent for use by the user's PIA 212 when a particular task has been requested to be performed. For example, the user 205 or the user's PIA 212 may recognize a technical problem with accessing a user account on a business organization's network. The user 205 may prompt the PIA 212, to utilize the business organization's technical support computing system (e.g., the business unit computing system 240, the 3$^{rd}$ party computing system 250, the call center computing system 260, etc.) to resolve the issue. In some cases, the PIA 212 may initiate a support action automatically, upon recognizing that a problem exists with the user's account. In an illustrative example, the PIA 212 may interact with the organization's computing system using an instance of a virtual task agent 232 configured for correcting a particular problem being experienced by the user (e.g., a lost password, a locked account, an unresponsive webpage, and the like) and/or a virtual task agent 232 configured for communicating to a particular computing system or call center of a particular business organization. In doing so, the components of the PIA 212, PIA 222, the PIA computing system 220, the PIA platform 230 may operate together to improve the user's experience with electronic interactions with an organization's computing systems by simplifying the user interface to a natural language interface, securely storing user information in an encrypted data store to allow for fast and secure access to user information for multiple and approved uses, learning preferences and characteristics of the user to predict possible actions that the user may likely desire to be performed while minimizing the number of inputs required to be entered by the user. Additionally, such a system may allow a user or/or the business organization to avoid fraudulent uses of the customer's personal information and/or the customer's confidential business information by allowing the customer to easily approve and/or modify the personal or confidential business information via a secure network connection, before access is given to the data to the organization and/or third party representatives.

Figure 3:
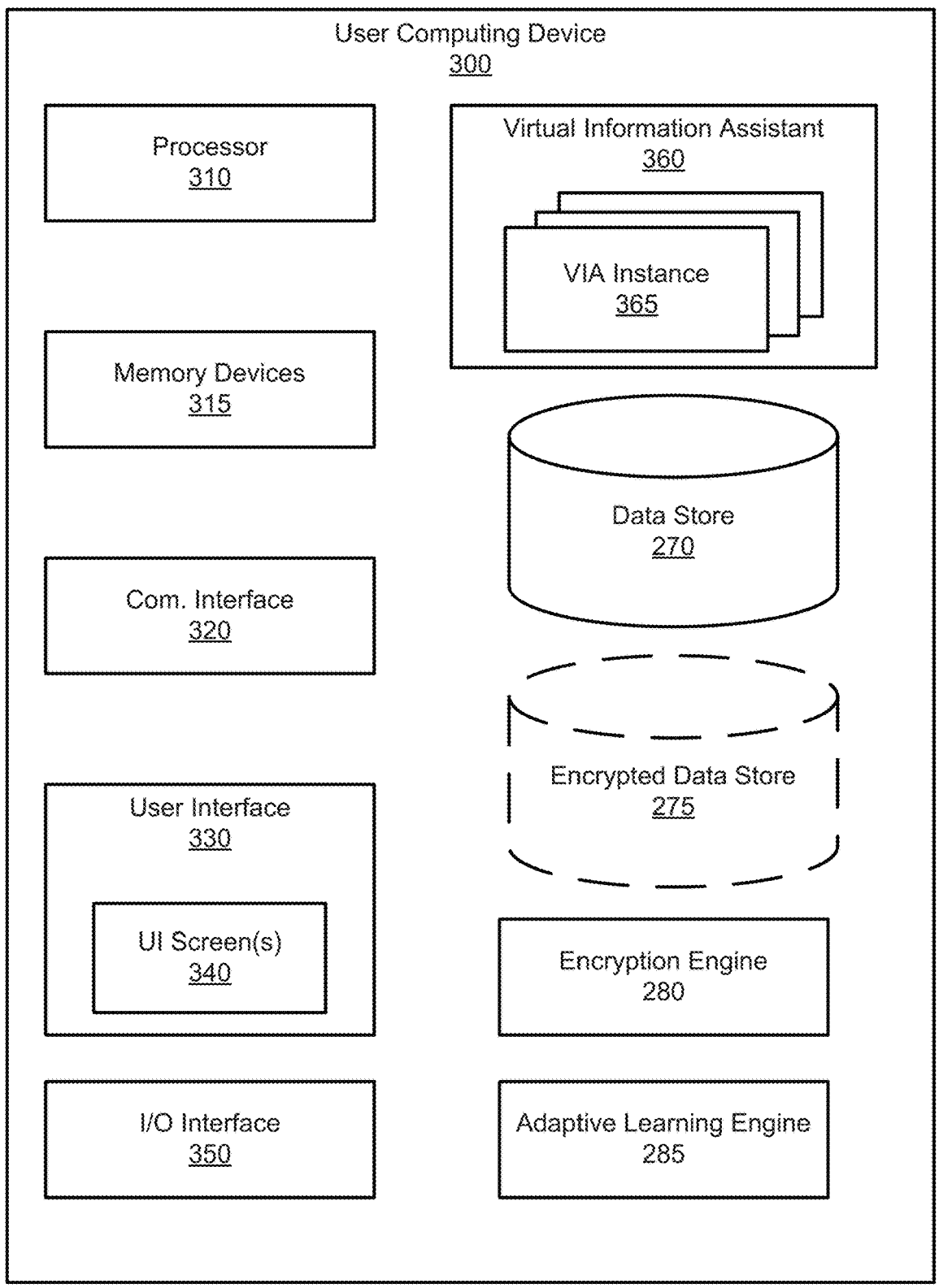
FIG. 3 shows a block diagram representation of an illustrative computing device processing a personal information assistant application according to one or more aspects of the disclosure.

FIG. 3 shows a block diagram representation of an illustrative computing device 300 configured for processing a personal information assistant application according to one or more aspects of the disclosure. The illustrative user computing device 300 may include one or more user devices 211, such as the smart phone 216, the laptop computer 214, a tablet computer, a desktop computer and/or the like. The user computing device 300 may comprise a processor 310 (e.g., the processor 103), one or more memory devices 315 (e.g., RAM 105, ROM 107, Memory 115, etc.), a communication interface 320 (e.g., modem 127, LAN interface 123, etc.), a user interface 330 that may include a display device for displaying one or more user interface screens 340, an input/output (I/O) interface (e.g., the I/O module 109, etc.), and the like. The processor 310 may be configured to execute instructions that cause a personal information assistant 360 (e.g., the PIA 212, the PIA 222, etc.) to be accessible to the user 205 of the user computing device 300. The PIA 360 may include one or more instances 365 of a PIA that may correspond to a personal life PIA, a work life PIA, a specific task PIA (e.g., a form fill PIA, a technical support PIA, etc.). The user computing device 300 may further include one or more data stores, such as data store 270, encrypted data store 275, and the like. In some cases, user computing device 300 may access one or more remote data stores via the network 215. The user computing device 300 may also include an encryption engine 280, an adaptive learning engine 285 or other such module or engine (e.g., a natural language interface engine, etc.) to facilitate operation of the PIA 360.

One or more aspects of the disclosure may be embodied in computer-usable data or computer-executable instructions such as in one or more modules, executed by the processor 310 to perform the operations described herein. Generally, modules may include routines, programs, objects, components, data structures, and the like that perform particular operations or implement particular abstract data types when executed by one or more processors in a computer or other data processing device. The computer-executable instructions may be stored on a computer-readable medium (e.g., the memory devices 315) such as a hard disk, optical disk, removable storage media, solid-state memory, RAM, and the like. The functionality of the modules may be combined or distributed as desired in various illustrative examples. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein. In some cases, the data tables may be stored as data structures (e.g., a tabular data structure), an XML file, a binary file, and/or the like.

In some cases, the processor 310 may process instructions to provide personal information assistant functionality to the user. In an illustrative example, the processor 310 may process instructions that may cause the PIA 360 to interact with the user via a natural language interface using one or more of the user interface 330, the user interface screens 340, the communication interface 320 and/or the I/O interface 350 to receive information from the user. In some cases, the processor 310 may process instructions that may cause the PIA 360 to monitor user interactions with one or more remote computing systems, such as the business unit computing system 240, the third party computing system 250, and/or the call center computing system 260 via one or more communications networks, such as the Internet, a telecommunications network, and/or the like to monitor information corresponding to one or more user actions in response to information presented to the user from the one or more remote computing systems. Based on this information, the PIA 360 may determine one or more user preferences, one or more user instructions, publicly available information, and/or secure or encrypted information from the user. The PIA 360 may identify non-identifying information (e.g., a website map, phone system menu selections, etc.) that may be stored in the data store 270, which may or may not be encrypted. In some cases, the PIA 360 may receive private (e.g., non-public information) information corresponding to the user 205, which may be stored in the encrypted data store 275. In some cases, the PIA 360 may be communicatively coupled via the network 215 to the remotely located PIA computing system 220, which may include one or more encrypted data stores storing encrypted personal information corresponding to the user 205. Such information may be stored in the as a data table, a data structure, or the like. In some cases, the encrypted data store 275 may optionally be used to locally store encrypted information received from an encrypted data store (e.g., the encrypted data store 224) remotely located from the user computing device 300. Any encrypted data may be encrypted or decrypted locally by the encryption engine 280 using one or more encryption or decryption algorithms. The adaptive learning engine 285 may be capable of monitoring user activity and/or user information processed by the natural language interface as received from the user 205. In some cases, the adaptive learning interface may use one or more adaptive learning and/or machine learning techniques including, but not limited to, a decision tree learning model as a predictive model for mapping observations of an input to a target value, an association rule model to determine a relationship between model inputs, an artificial neural network algorithm, a deep learning algorithm, a Bayesian network or other graphical model showing relationships between different parameters, and/or the like.

Figure 4:
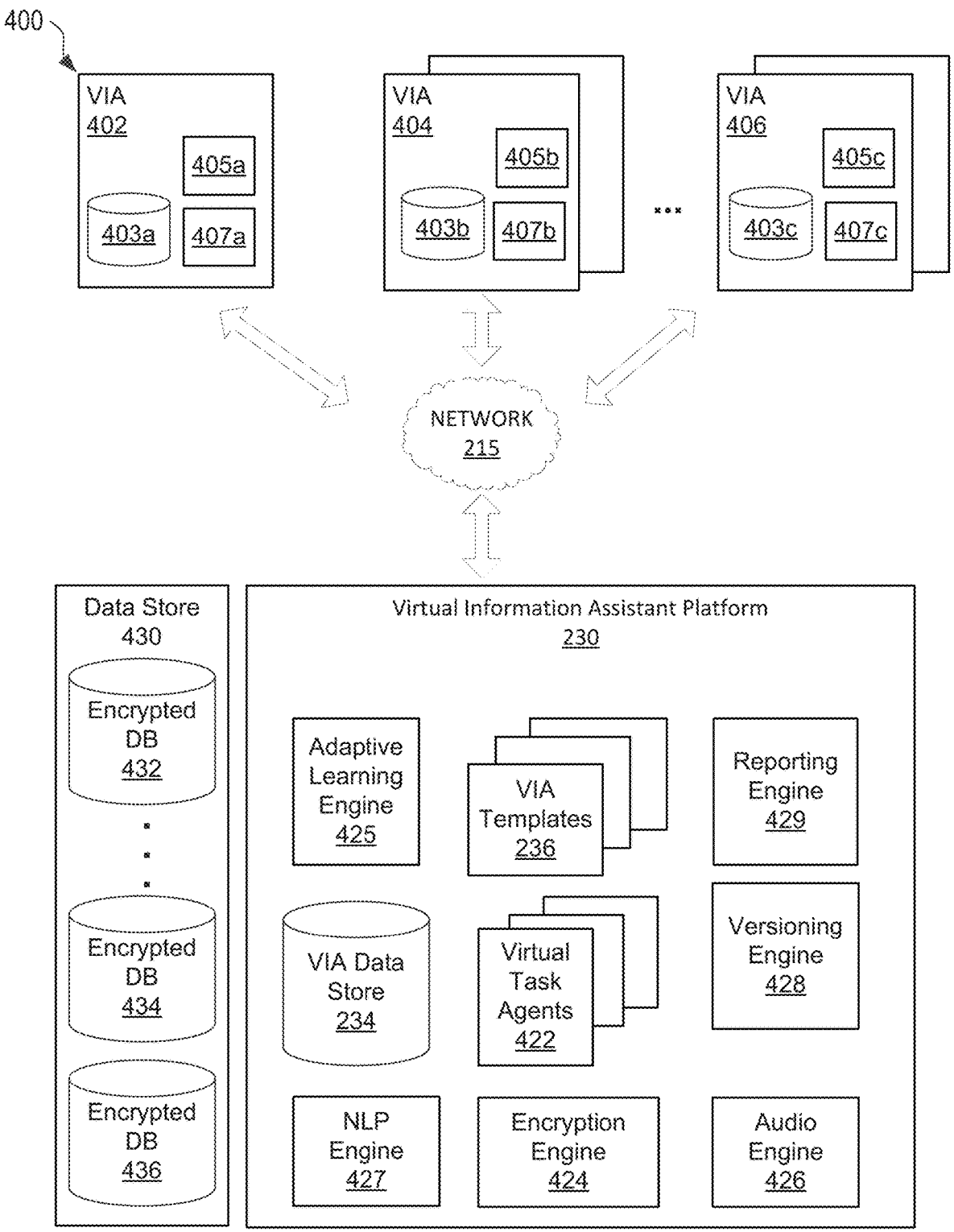
FIG. 4 illustrates shows a block diagram representation of an illustrative personal information assistant computing system according to one or more aspects of the disclosure.

FIG. 4 illustrates shows a block diagram representation of an illustrative personal information assistant computing system 400 according to one or more aspects of the disclosure. In the illustrative example, the PIA computing system 400 may comprise a plurality of virtual information assistants and/or personal information assistant templates, such as PIA 402, PIA 404, PIA 406, etc.). In some cases, the PIAs may be remotely located and processed at a plurality of user devices, each associated with one or more users. The PIA computing system may comprise a plurality of user devices, each belonging to a different user and having at least one PIA 402, 404, 406 associated with the user. For example, a first user may be associated with a first PIA 402, a second user may be associated with two or more PIAs 404, a third user may be associated with one or more PIAs 406, and the like. Each PIA may include a natural language processing (NLP) engine 407*a-c*, or may be linked to a central NLP engine 427, for receiving user inputs from the user 205 that may be processed by an automatic speech recognition algorithm and may be processed by the natural language processing engine 407*a-c* to translate the speech input into concepts that can be easily parsed and understood by the virtual information assistants and/or the personal information assistant platform 230. In some cases, the natural language processing engine 407*a-c* may parse textual, audio and/or video input to identify sentence boundaries and individual words and punctuation within a sentence. Further, the natural language processing engine 407 *a-c* may identify parts of speech within the natural language input and assign the identified parts of speech individual words. Further, morphological decomposition algorithms may be processed to decompose compound and/or complex words (e.g., medical terms, legal terms, etc.) into smaller portions (e.g., words, word roots, suffixes, prefixes, etc.). Further, shallow parsing techniques may be used to identify phrases based, at least in part, on identified parts of speech and the input text, audio, or video input may be parsed to segment text into meaningful groups. Further, the natural language engine may process instructions to receive the natural language input as text, audio and/or video input and process the input to perform translations, spelling and/or grammatical error identification and/or may process the input to identify and/or translate colloquialisms or figures of speech. One or more algorithms may be used by the natural language processing engine, such as support vector machines, hidden Markov models, conditional random fields, N-grams, and the like.

As discussed above, the PIA computing system 400 may include a plurality of PIAs (e.g., the PIA 402, the PIA 404, the PIA 406, etc.) that may be associated with a plurality of users. For example, PIA 402 may be associated with a first user and may interact with the first user via the natural language interface 407*a*, store at least a portion of the information learned about the first user via the natural language interface 407*a* in an encrypted data store 403*a*, where the PIA 402 may use the information learned about the first user to adapt the PIA functionality to the characteristics of the first user by the adaptive learning engine 405*a*. The PIA 402 may be configured as a personal life PIA to assist the user in their personal life activities (e.g., financial activities, insurance activities, medical activities, etc.), their work life activities (e.g., performing a job function, technical support activities, etc.), or both personal life activities and work life activities. In some cases, a user may be associated with a PIA comprising a plurality of PIA instances, such as the PIA 404, or a plurality of PIAs, where each of the plurality of PIA instances may be configured to assist the user in a different function. For example, a second user may be associated with the PIA 404 comprising a first PIA configured as a personal life PIA and a second PIA configured as a work life PIA, where each PIA may operate independently such that the adaptive learning engine 405*b*, the natural language engine 407*b* of the personal life PIA 404 may be configured to adapt the personal life PIA 404 to the second user's personal life and store the personal life information in an encrypted personal life data store 403*b*. Similarly, a work life PIA may include an adaptive learning engine and natural language processor configured to adapt the work life PIA to the second user's work life and store the work life information in an encrypted work life data store. In some cases, the personal life data store 403*b* and the work life data store may be the same data store and/or different data structures (e.g., a database, a data object, etc.) stored in a same encrypted data store. In some cases, a user (e.g., a third user) may be associated with a PIA 406 comprising a plurality of PIA instances, where the PIA instances may be associated with either the user's work life or personal life in general, with different aspects of the third user's work life or personal life (e.g., a financial activity PIA, an insurance activity PIA, a technical support PIA, a medical activity PIA, and the like), or a combination. In such cases, the PIA 406 may include a encrypted data store 403*c*, an adaptive learning engine 405*c*, and a natural language processing engine 407c used by each PIA instance. In some cases, each PIA instance may include an instance of the encrypted data store 403c, the adaptive learning engine 405c, and/or the natural language processing engine 407c adapted to the particular functionality associated with each PIA instance.

The different PIAs of the PIA computing system 400 may be communicatively coupled to a remote computing system (e.g., the personal information assistant platform 230, etc.) operated by an organization (e.g., an insurance provider, a financial institution, a governmental organization, an education institution, etc.) to provide and adapt the PIA functionality to a plurality of individuals. In some cases, the PIA platform 230 may be communicatively coupled to each of the PIAs associated with remote users, such as the PIAs 402, 404, and 406. The PIA platform 230 may include an adaptive learning engine 425, an audio engine 426, an encryption engine 424, the natural language processing engine 427, a versioning engine 428, a reporting engine 429, one or more personal information assistant templates 236, one or more virtual task agents 422, a PIA data store 234, etc. The PIA platform 230 may include and/or may be communicatively coupled to at least one data store 430, which may include one or more encrypted data stores (e.g., the encrypted databases 432, 434).

In some cases, each PIA associated with a user may operate independently, such that a personal information assistant instance may be created and/or installed on a user device associated with the particular user. In some cases, a user may install and/or be given access to a PIA interface that provides a secure and/or encrypted interface to a PIA instance associated with the user and operating on a computing device remote from the user, such as a server of an organization computing system. User information sent from and/or received at the user device may be communicated over a secure and/or encrypted communication link via the network 215. Similarly, a business organization computing system, such as the business unit computing system 240, the third party computing system 250, the call center computing system 260, etc., may also be associated with a PIA installed locally to the computing system and/or a PIA instance operating remotely on the PIA platform 230. In an illustrative example, a PIA instance associated with one or more business unit computing systems may include a virtual task agent 422. The virtual task agents 422 may be a personal information assistant that may configured to perform a particular action or function, such as filling out a form with user information or otherwise gathering user information.

In some cases, the virtual information assistants 402, 404, 406 may be generated based on one or more PIA templates 236 according to initial information known about the user when the user initially signs up to participate in the personal information assistant program offered by the business organization. In some cases, the PIA templates 236 may include functionality generally learned about the user based on information (e.g., demographic information, geographic information, telematics information, language information, etc.) that has been scrubbed of personally identifying information. For example, the adaptive learning engine 425 may analyze information initially received from a user to initially personalize the PIA 402 for use with that user. For example, the adaptive learning engine 425 may receive information from the user that identifies a geographic region in which the user lives, whether the user is an existing customer of the business organization, languages spoken by the user, and the like. In doing so, the adaptive learning engine 425 may be capable of providing an initial version of the PIA 402 to the user that may more easily adapt and/or evolve to the particular user's preferences. Additionally, the adaptive learning engine 425 may receive information from a plurality of PIAs that has been scrubbed of personally identifying information, which may be stored in the PIA data store 234 and can be used to adapt and/or evolve the PIA templates 236 based on learned user interactions with their respective PIAs. For example, regional language differences (e.g., accent information, informal language usage information, etc.) may be analyzed such that the natural language interface associated with one or more PIA templates may be updated based on the language differences learned from the individual PIAs within the region. Such adaptations to the PIA templates 236 may be monitored by the versioning engine 428 so that the functionality may be incorporated into virtual task agents 422 and/or other PIAs in the region to allow the personal information assistant to better adapt to individual users within the region.

In some cases, one or more of the PIA templates 236 may correspond to functionality that may be performed by the PIA, such as technical support functionality (e.g., support for email accounts, website support, phone service support, and the like.). For example, the PIA templates 236 may include a template for accessing and/or navigating a particular website, a template for accessing and/or navigating a particular phone call center system, a technical service template configured to recognize and/or facilitate responses to technical issues, and the like. The versioning engine 428 may be used to manage and/or update the PIA templates 236, the virtual task agents 422 and/or the PIAs 402, 404, and 406 that may incorporate functionality based on the different PIA templates 236, and the like.

In some cases, an interaction between the user 205 and one or more business computing systems may require a signature or other such verification of a transaction. In such cases, the PIA 402, 404, or 406 may interact with the reporting engine 429 of the PIA platform 230, such that the reporting engine 429 may generate a paper document to be sent to the user 205 that may be kept for the user's record and/or may include at least a portion for return with a signature. In some cases, the reporting engine 429 may cause an electronic signature page to be displayed on a user interface (e.g., a webpage, a signature page on a PIA application, or the like), on which the user 205 may use an input device (e.g., a touch screen, a stylus, a keyboard, etc.) to provide an electronic signature to be sent to the necessary location (e.g., the business unit computing system 240, the third party computing system 250, the call center computing system 260, and the like). By doing so, the PIA may provide a more efficient and faster interface to allow the user 205 to provide positive verification of a transaction, or other interaction with the organization. In some cases, the reporting engine 429 may be used to generate an output to the user 205 that may be used to validate user information, transfer of user information, and/or use of the user information. For example, the reporting interface 429 may be used to generate a user interface screen representative of a form to be filled out by the user (e.g., an insurance application form, a financial account information form, a medical information form, a tax information form, or the like).

For example, in some cases, the user 205 may interact with a PIA 212, 222, or 402 to interact with an organization's computer system (e.g., the business unit computing system 240). In such cases, the business unit computing system 240 may interact with the PIA platform 230, or otherwise have virtual task agent 232 (or other such virtual information assistant) available to facilitate the user interaction. In some cases, a customer service representative, business user and/or an automated may initiate a request for user information such as via a virtual task agent. For example, a customer service representative may access a user interface of the business unit computing system 240 to interact with the user 205 via the network 215 with respect to a user transaction, such as a bank account application, a student loan application, an insurance quotation, a government form, an education enrollment application, and the like. The user may utilize the PIA 212 or 402 via one or more user devices 211 to facilitate the interaction with the customer service representative (e.g., via a web page, a voice interface, a video interface, a messaging interface and the like). In some cases, the customer service representative may request customer information (e.g., confidential customer information, etc.) via a user interface screen, such as a fillable form. In some cases, a link on the fillable form user interface screen of the business unit computing system may cause a request (e.g., a request sent via a secure network connection, an encrypted message, etc.) to be sent to the user 205 for information to complete the form. In some cases, the received communication may trigger an information request at the personal information assistant platform 230, such that a virtual task agent 232 may, in turn, request the information from the user 205. For example, the virtual task agent 232 may process the information request to identify the requested customer information that may be stored in the encrypted data store 224 associated with the user 205. This information may be sent via a secure network connection over the network 215 as an encrypted message such that the information is not decrypted until the information is displayed to the user by the PIA 212 on the user devices 211.

Once displayed, the user 205 may view and/or edit the information directly on their user device, where added and/or modified information saved by the user 205 may be stored in the encrypted data store 224 (e.g., a particular encrypted data store corresponding to the user 205 of the data store 430) and accessible to the user via subsequent requests. Once the user 205 has viewed and/or edited the information, the user may provide an input via an I/O device (e.g., a keyboard, a touch screen, a pointing device, an audio input, a video input, etc.) of the user device 211 to indicate to the PIA 212 whether the user 205 approves or declines the information request received from the business unit computing system 240. If the user 205 declines the request, no information is sent to the business unit computing system 240 and the form remains unfilled. In cases where the user approves the information request, the requested information is sent via a secure and encrypted message to the PIA platform 230 such that the virtual task agent 232 communicates the encrypted information to the requesting computing system (e.g., the business unit computing system 240) to complete the fillable form. In some cases, the information is not decrypted until it is displayed and/or entered onto the form.

Figure 5:
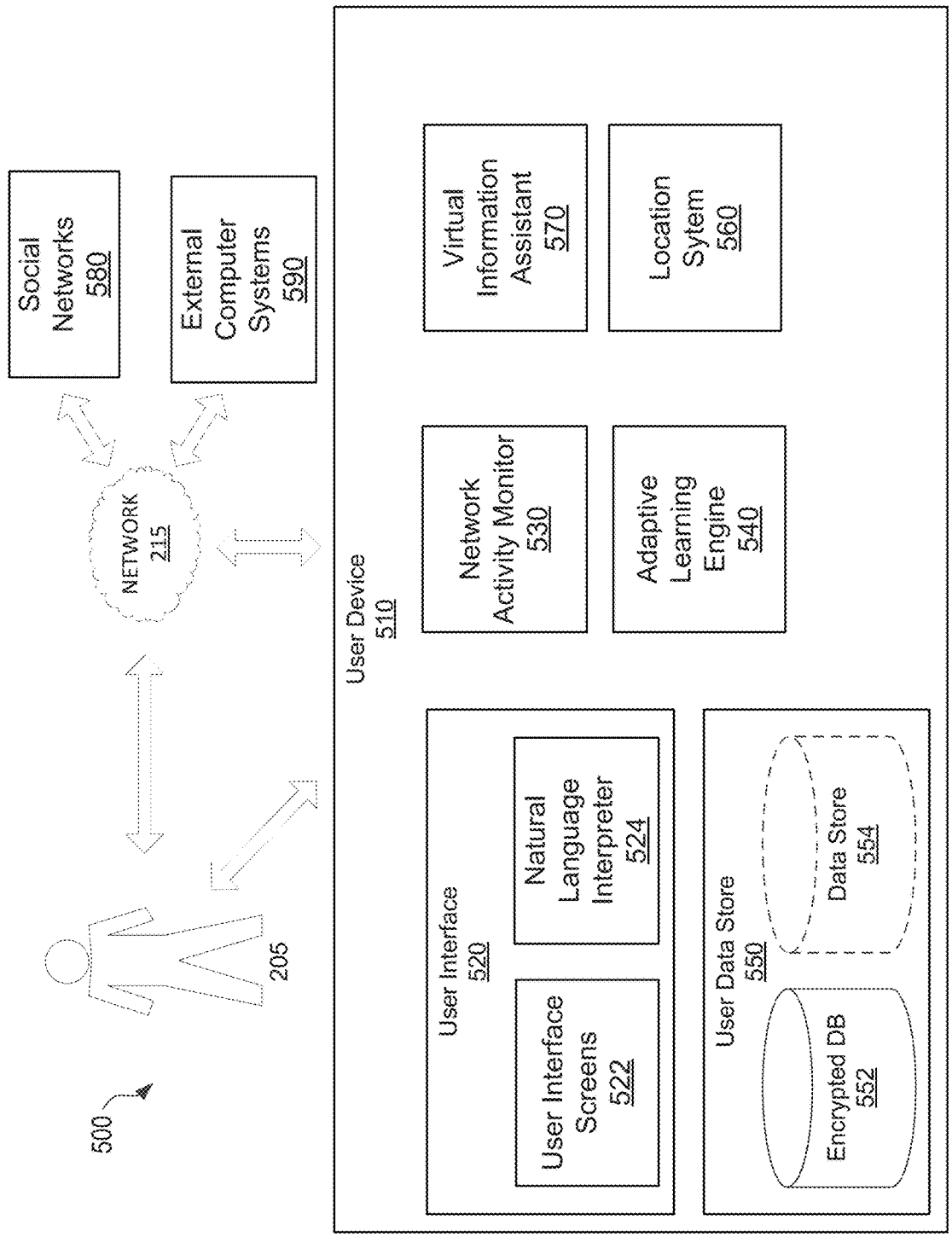
FIG. 5 shows a block diagram representation of a personal information assistant system capable of monitoring user activity over a network on a user device according to one or more aspects of the disclosure.

FIG. 5 shows a block diagram representation of a personal information assistant system 500 capable of monitoring user activity over a network 205 at a user device according to one or more aspects of the disclosure. In some cases, the personal information assistant 212 may be capable of monitoring user communications and/or activity over one or more networks, analyze the communications and adapt the PIA behavior based on that analysis. For example, the user 205 may use one or more user devices 510 (e.g., the user devices 211, etc.) to interact with one or more remote computing systems via the network 215. The user device 510 may include a user interface 520, a user data store 550, a network activity monitory 530, an adaptive learning engine 540, a location system 560, and/or a personal information assistant 570 (e.g., the PIA 212, 402, 404, 406, etc.). The user 205 may use the user interface 520 of the user device 510 to interact with one or more remote computing systems, such as one or more social networks 580 (e.g., Facebook, LinkedIn, Twitter, etc.) and/or one or more external computer systems 590, such as the business unit computing system 240, the third party computing system 250, the call center computing system 260, and/or the like.

For example, the user 205 may access a web browser user interface screen and/or an application user interface screen to post and/or view messages on the one or more social networks 580. Also, the user may communicate with or otherwise access one or more additional computing systems 590 via the network 215 using a web interface, an application interface, or other such interface. The user 205 may communicate with the social networks and/or the external computing systems 590 with or without the assistance of the personal information assistant 570. In some cases, an internet browsing history may be stored in a local data store, such as the data store 550. In some cases, the user 205 may communicate with the one or more social networks 580 using an audio interface (e.g., a microphone, etc.) a video interface (e.g., a camera, etc.), a textual interface (e.g., a keyboard, etc.) and/or via a pointing device (e.g., a mouse, a touch screen, etc.).

The network activity monitor 530 may monitor one or more network messages sent while the user communicates with the one or more social networks 580 and/or the external computing systems 590 and store information in the data store 550. In some cases, the data store 550 may include an encrypted data store 552 and/or an unencrypted data store 554. In some cases, the network activity monitor 530 may directly monitor the messages communicated via the network. In some cases, the network activity monitor 530 may be communicatively coupled to the natural language interpreter 524 and/or the personal information assistant 570 to monitor messages that have been interpreted by the natural language interpreter 524 and/or to monitor messages communicated and/or received by the personal information assistant 570. In such cases, the network activity monitor 530 may identify information associated with the user 205 for use by the adaptive learning engine 540 to adapt the personal information assistant 570 to its corresponding user 205 For example, the network activity monitor may identify information corresponding to a personal life experience and/or a work life experience as posted on one or more social networks 580 by or about the user 205, such as a vehicle purchase, a home purchase, a fitness or health related event, an employment change or promotion, or other such personal life or work life event. In some cases, the network activity monitor 530 may monitor an interaction between the user and the personal information assistant 570. to identify one or more user preferences and/or characteristics of the user interaction and store this information in the user data store 550, such as in the encrypted DB 552, for use by the adaptive learning engine 540 to adapt and/or evolve the personal information assistant 570 to the user 205. Further, the network activity monitor 530 may monitor interactions between the personal information assistant 570 and the external computer systems 590 and store such information in the user data store 550 for use by the adaptive learning engine 540 to adapt and/or evolve the personal information assistant 570 to the user 205. In some cases, the user device 510 may include a location system (e.g., global positioning system, a telecommunications positioning system, etc.) that may be used by the personal information assistant 570 when interacting with the user and/or the external computing systems. In some cases, the and/or the adaptive learning engine 540

In some cases, the network activity monitor 530 may identify a class of user interaction, such as a technical service interaction, an insurance-related interaction, a financial activity interaction, a health related activity between the user 205, the personal information assistant and/or one or more external computer systems 590 based on one or more messages sent via the network 215. The interaction information may be scrubbed of personally identifiable information and stored in the data store 554, in either the encrypted data store or the unencrypted data store 554 and may be used by the adaptive learning engine 540 to adapt and/or evolve the personal information assistant 570 using one or more adaptive learning techniques. In some cases, this information may be communicated to the personal information assistant platform 230 via the network 215 such that the adaptive learning engine 425 may use one or more adaptive learning techniques to adapt and/or evolve the PIA templates 236 and/or Virtual task agents 422 based on the information. In some cases, the scrubbed information may be stored in the PIA data store 234. When a PIA template and/or a virtual task agent is updated, the versioning engine 428 may update the version and store the versioning information in the PIA data store 234.

Figure 6:
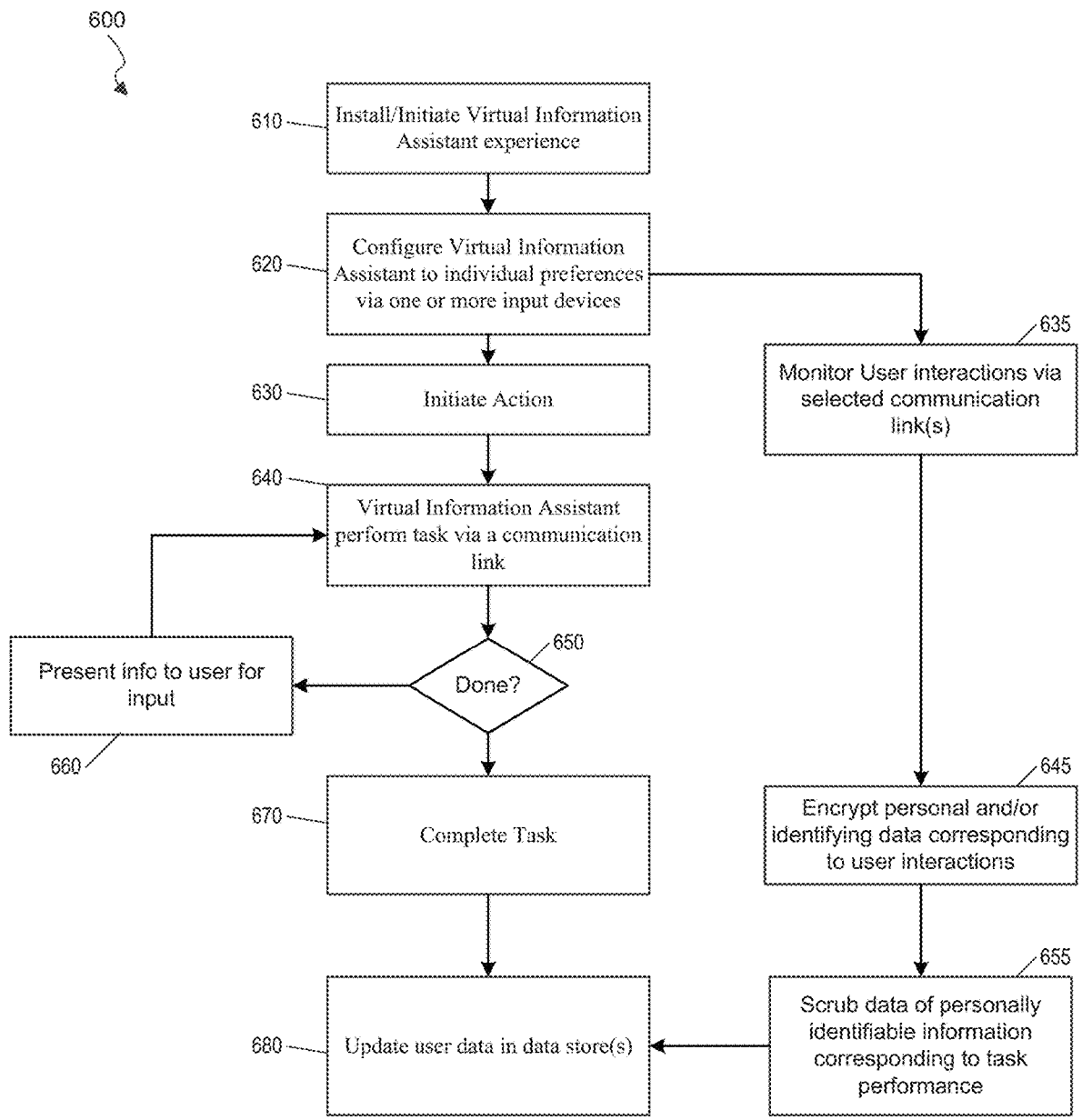
FIG. 6 shows an illustrative method of user interaction with a personal information assistant according to one or more aspects of the disclosure.
Figure 7:
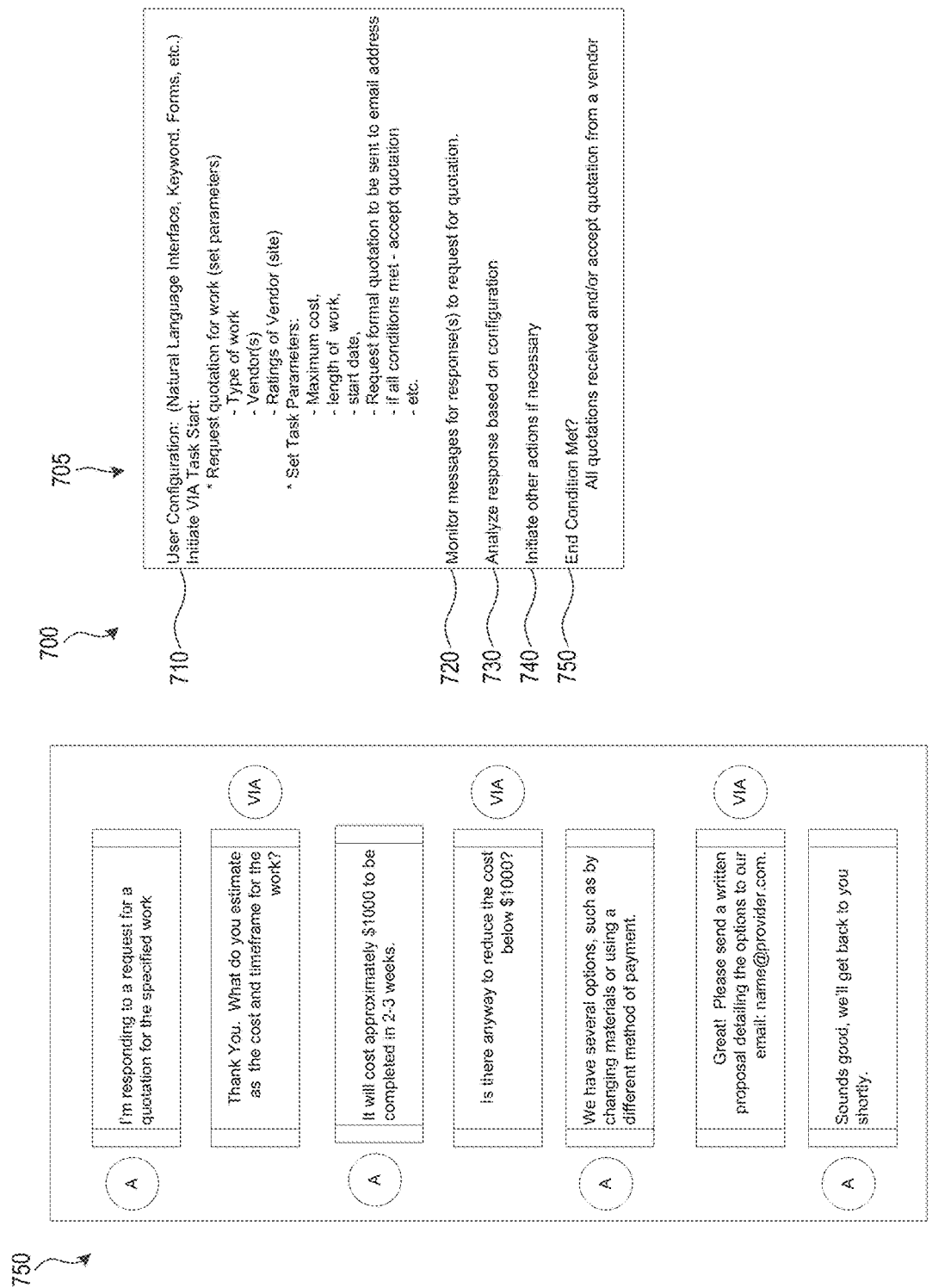
FIGS. 7-10 show illustrative user interface as a personal information assistant performs a requested task according to one or more aspects of the disclosure.

FIG. 6 shows an illustrative method 600 of user interaction with a personal information assistant 212 according to one or more aspects of the disclosure. In some cases, at 610 a user may install, or otherwise initiate, an interaction with a virtual information assistant, such as the PIA 212 of FIG. 2. For example, the user 205 may install or have installed a personal information assistant on one or more user devices 211, such as the smart phone 216. In some cases, the user 205 may initiate an interaction with a personal information assistant via a network link to the organization providing the virtual information assistant, through which the user 205 may enroll in or activate a personal information assistant service to be provided, either remotely (e.g., using PIA 222) or locally (e.g., using PIA 212). Once initiated, the user 205 may configure the personal information assistant 212, 222 to personalize the interaction using one or more of a text interface (e.g., a keyboard, a touch screen, etc.), an audio interface, a video interface or the like, at 620. The user 205 may configure the personal information assistant 212 to the user's personal preferences through text, audio and/or video interactions that may be interpreted by the personal information assistant via the natural language interpreter and/or the adaptive learning engine 285. Over time, the adaptive learning engine 285 may adapt or evolve the personal information assistant to better reflect the preferences of the user to allow the personal information assistant to act as a proxy for the user 205.

At 630, once the personal information assistant 212 has been configured to act as a proxy for the user in one or more personal-life and/or work-life computer network based interactions, the user 205 may initiate an action by the personal information assistant 212 on the user's behalf. As an illustrative example, the user 205 may initiate an interaction with a business unit computing system 240, the third party computing system 250, the call center system 260, etc., such as to receive a quotation for insurance, open a financial account, initiate a technical support activity, or other such electronic interaction utilizing the personal information assistant 212 as a proxy for at least a portion of the interaction. In some cases, the personal information assistant 212 may initiate an interaction (e.g., a technical support activity) on its own, such as when an account error has been identified. At 640, the personal information assistant 212 may perform at least a portion of the tasks required during the initiated interaction with the external computing system. Examples of such interactions are discussed below with respect FIGS. 7-11. During the interaction with the external computing system, the personal information assistant 212 may monitor the messages to determine whether the designated task has completed, at 650. If not, the personal information assistant may present information to the user 660 as part of the task-based interaction process. If the task has been completed, the personal information assistant may internally indicate that the task has been completed and/or may provide a message to the user to indicate the task completion at 670. In some cases, the task completed during the interaction with the external computing systems may include personal and/or work information associated to the user that may be stored in the encrypted data store associated with the user (e.g., encrypted data store 275, encrypted database 432, etc.). For example, in some cases, the interaction may involve a vehicle loan application and/or a vehicle insurance application for a newly acquired vehicle, such that information corresponding to the vehicle (e.g., make, model, VIN, mileage, etc.) may be encrypted and stored in the secured data store. In another illustrative example, a financial account application process may be assisted by the personal information assistant 212 such that personal financial information (e.g., an account number, salary information, employment history information, etc.) may be encrypted and stored in the secured data store. In a third illustrative example, the personal information assistant 212 may act as the user's proxy in a technical support interaction such that technical account information (e.g., a user name, a network domain, a password, other login information, other account information, etc.) may be encrypted and stored in the secure data store. The virtual information assistant In some cases, when the personal information assistant 212 has been initialized and/or configured to act as the user's proxy at 620, one or more user interactions with outside computing systems (e.g., business computing systems, social networks, etc.) may be monitored to identify one or more user preferences and/or characteristics that may be used to further adapt or evolve the PIA 212 to act as the user's proxy. For example, the network activity monitor 530 and/or the adaptive learning engine 540 may monitor messages communicated via the network 215 to and/or from the user device 510 to identify user preferences based on an analysis of the communications. At 645, the adaptive learning engine may encrypt the information learned about the user's preferences and/or characteristics. Additionally, at 655 the adaptive learning engine and/or the network activity monitor 530 may scrub at least a portion of the information of personal identifying information for use in evolving the PIA templates and/or the virtual task agents. Such encrypted and/or scrubbed information may then be stored in one or more user data stores.

FIGS. 7-11 show illustrative user interfaces as a personal information assistant performs a requested task according to one or more aspects of the disclosure. A PIA communication process 700 with an agent of an organization may include one or more steps as shown in the illustrative method 705. For example, at 710, a user may configure the PIA using a natural language interface, one or more keywords, forms and/or the like and initiate a task to be performed at least partially by the PIA. For example, the user 205 may request a quotation for work to be done on behalf of the user, such as to set parameters of the associated tasks, such as a type of work to be done, one or more vendors to be contacted, a minimum rating of vendors that should be contacted, and the like. Additionally, one or more task parameters may be set, such as a minimum cost, a length of time in which the work is to be performed, a start date, whether a formal request for a quotation is to be sent, and certain threshold that, if met, the PIA should accept the quotation.

Figure 8:
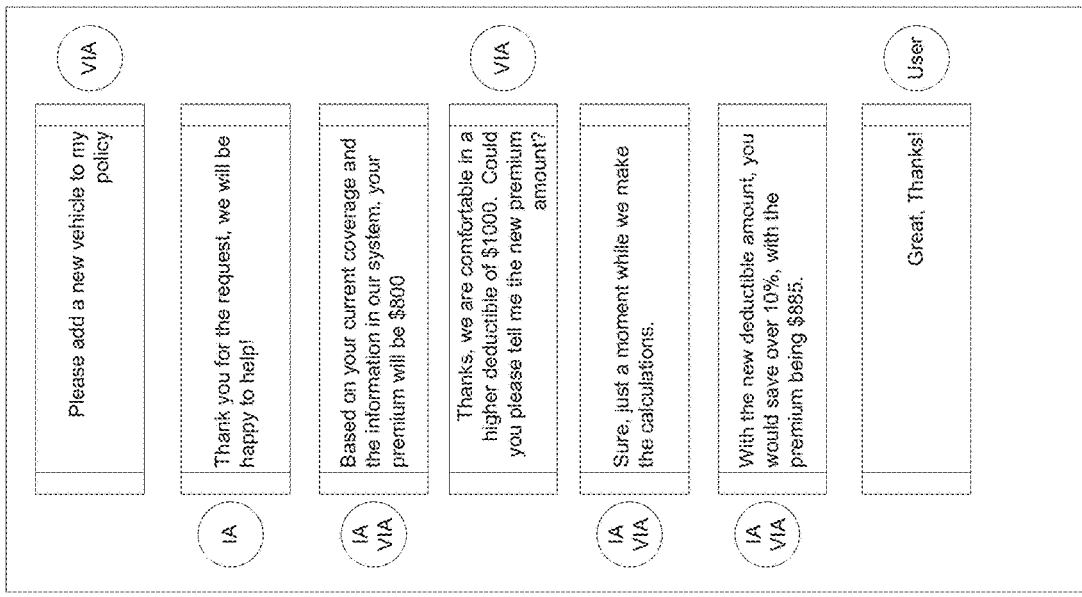
Figure 9:
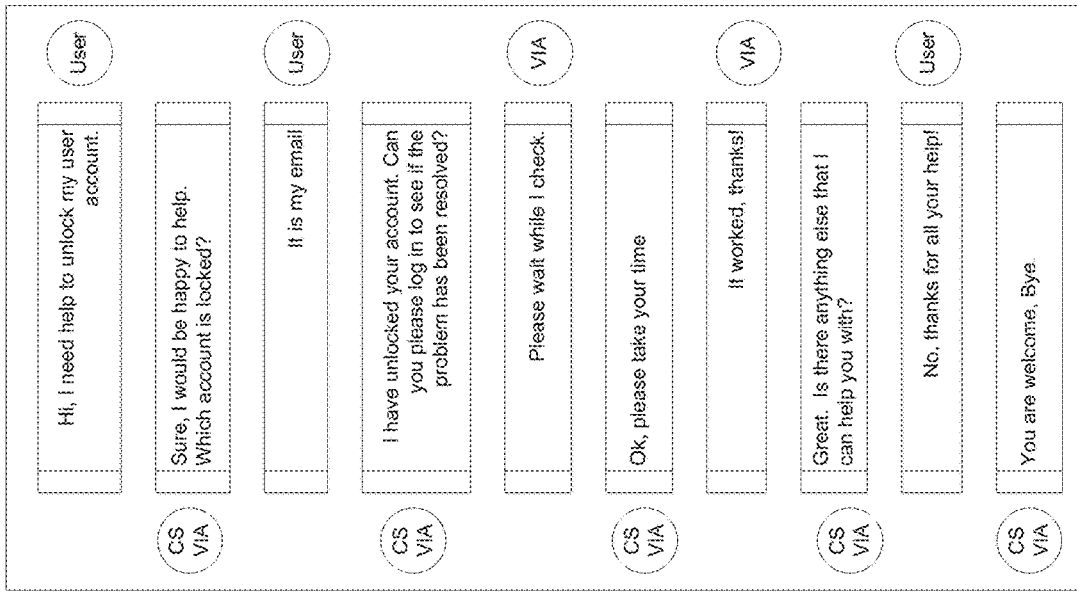

At 720, the PIA may monitor messages communications for messages from the contacted vendors that may be received via the network 215 including Internet communications, telecommunications network communications, email communications, and the like that may be received at one or more user devices 211. At 730, the identified communication responsive to PIA or user communication may be analyzed based on the parameters set. At 740, based on the analysis initiate one or more other actions and at 750 determine whether an end condition has been met, such as when all requested quotations have been received, a time limit has expired, and/or whether the PIA has accepted a quotation based on the predetermined thresholds. The User interface 750 shows an illustrative communication interaction between an agent of an organization and the PIA configured based on one or more user parameters. Similarly, FIGS. 8 and 9 show illustrative communications as may be displayed at a user interface screen identifying different interactions involving a user, an agent of an organization, and one or more virtual information assistants and/or task agents. For example, FIG. 8 shows an illustrative interaction between a user and the user's personal information assistant and an insurance agent and the insurance agent's personal information assistant and/or virtual task agent.

Figure 10:
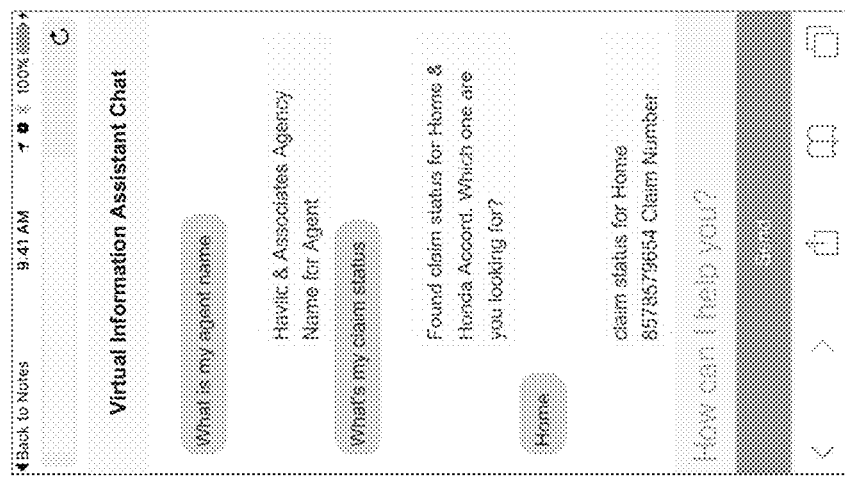

FIG. 9 shows an illustrative communication sequence resolving a technical problem experienced by the user between an organization's personal information assistant for resolving email issues, the user, and the user's virtual information assistant. FIG. 10 shows an illustrative chat between the user and the user's PIA. The PIA may access encrypted information based on an authenticated user interaction, where the user may be authenticated via one or more methods including a password verification procedure, a voice recognition procedure, and/or the like. In some cases, the user may edit the information during the chat, where the changed information may be immediately available to the Virtual Information Assistant, as the information may be validated by the user in near real time.

Figure 11:
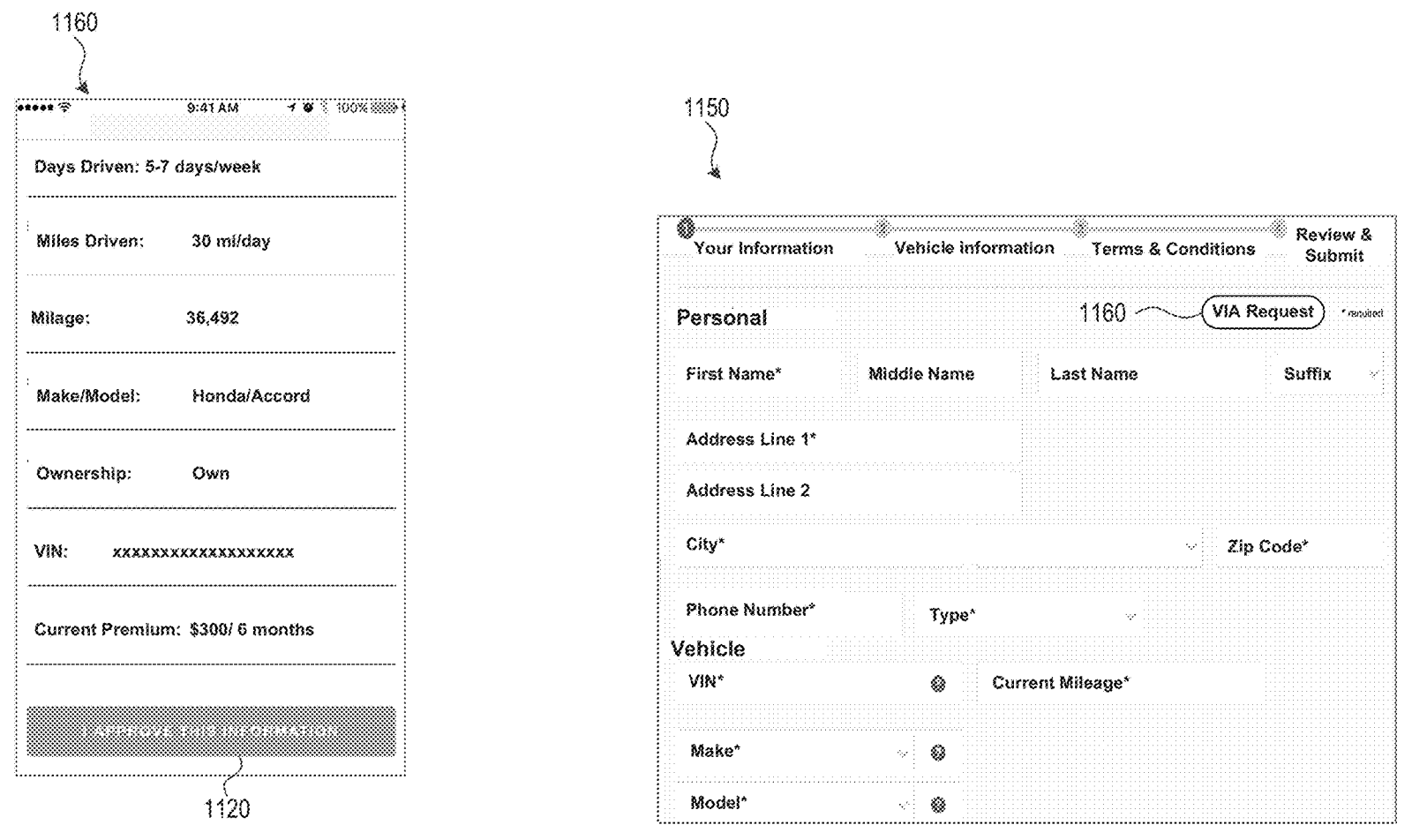

FIG. 11 shows illustrative user interfaces that may be displayed at a user device (e.g., user interface screen 1100) and a user interface screen that may be displayed at a remote computing device (e.g., agent user interface screen 1150). In an illustrative example of a user interaction with an organization's representative (e.g., a loan officer at a financial institution, an insurance agent, etc.), the user may request a product or service to be provided by the organization, such as a vehicle loan, a vehicle insurance policy, or other such product or service. The PIA 215 may be used to securely manage the communication of user information, such as by allowing the user to verify and/or approve the information before providing by the PIA 215, the approved and verified information to the business organization such as in a PIA fillable form 1160. The organization's representative may request the information from the user by initiating a request directly to the PIA, such as by selecting a PIA request input 1190 as displayed on the user interface screen 1150. In such cases, the organization may be provided an API or other method of interfacing with the personal information assistant platform 230, where a request for information input received from the user interface screen 1150 may cause the user's personal information assistant 212 to receive the user information (e.g., encrypted information) to be displayed to the user at one or more user devices 211. For example, the user interface screen 110 may include personal information concerning the user, such as name information, address information, contact information (e.g., a phone number, an email address, etc.), employment information, and the like. Additionally, the information may also include information concerning the product and/or service to be purchased. In the illustrative example of a vehicle loan and/or a vehicle insurance policy, the information may include information concerning the vehicle such as a number of miles driven over a given time period (e.g., daily, weekly, monthly, yearly, etc.), a total number of miles driven, a make and/or model of the vehicle, an ownership status (e.g., own, lease, etc.), a vehicle identification number (VIN), an insurance premium (if applicable), and the like. The user may be able to directly edit the information on the user interface screen, where the information may be saved to the encrypted data store in response to a user input, in near real time, or the like. Once the user has viewed and reviewed the information and performed any desired edits, the user may approve and/or verify the data using a user input (e.g., a button, a keyboard entry, a touch screen input, or the like). The user input may cause the PIA to communicate the verified information to the organization's computer system via a secured communication (e.g., encrypted, etc.) and, in turn, filling in the desired information on the fillable form. In some cases, the fillable form may be standardized form. In other cases, the fillable form may be customizable by the organization based on the task and/or information needed by the organization.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A personal information assistant computing system comprising:
   a computing device comprising:
      a processor; and
      a non-transitory memory device storing instructions that, when executed by the processor, cause the computing device to:
         configure a personal information assistant computing platform at least partially executing on the computing device based on user-specific information;
         receive, by the personal information assistant computing platform, an action request and one or more parameters associated with the action request from a user;
         analyze, by the personal information assistant computing platform, the action request and the one or more parameters associated with the action request to determine a task to be performed in response to the action request;
         based on determining the task to be performed, generate, by an adaptive learning engine of the personal information assistant computing platform, a first personal information assistant from a plurality of personal information assistant templates corresponding to different types of functionalities and different user-specific information, wherein the first personal information assistant is generated based on the user-specific information and the action request; and transmit, by the first personal information assistant, at least one message to a remote computing system in performance of the task, wherein the first personal information assistant functions as a proxy for the user in response to at least one response received from the remote computing system.

2. The personal information assistant computing system of claim 1, wherein configuring the personal information assistant computing platform includes receiving one or more user interaction using a natural language interface.

3. The personal information assistant computing system of claim 1, wherein receiving the one or more parameters associated with the action request includes receiving one or more action parameter thresholds associated with execution or completion of the action request.

4. The personal information assistant computing system of claim 1, wherein the non-transitory memory device stores the plurality of personal information assistant templates.

5. The personal information assistant computing system of claim 1, wherein the first personal information assistant comprises an application running at least partially on a user computing device associated with the user.

6. The personal information assistant computing system of claim 1, comprising: the remote computing system, wherein the remote computing system comprises a second personal information assistant operating at least partially on the remote computing system, wherein the second personal information assistant is configured to perform the task determined by the personal information assistant computing platform.

7. The personal information assistant computing system of claim 6, wherein the remote computing system is configured to facilitate providing a product or service to the user.

8. The personal information assistant computing system of claim 6, wherein the remote computing system is configured to determine whether an end condition associated with the task has been met, and transmit an indication of completion of the task to the first personal information assistant.

9. A computing device comprising:
a processor; and
a non-transitory memory device storing instructions that, when executed by the processor, cause to computing device to:
configure a personal information assistant computing platform at least partially executing on the computing device based on user-specific information;
receive, by the personal information assistant computing platform, an action request and one or more parameters associated with the action request in a natural language communication from a user;
analyze, by the personal information assistant computing platform, the action request and the one or more parameters associated with the action request to determine a task to be performed in response to the action request;
based on determining the task to be performed, generate, by an adaptive learning engine of the personal information assistant computing platform, a first personal information assistant from a plurality of personal information assistant templates corresponding to different types of functionalities and different user-specific information, wherein the first personal information assistant is generated based on the user-specific information and the action request; and
transmit, by the first personal information assistant, at least one message to a remote computing system in performance of the task, wherein the first personal information assistant functions as a proxy for the user.

10. The computing device of claim 9, further comprising a microphone configured to capture the natural language communication, the natural language communication comprising at least one word spoken by the user.

11. The computing device of claim 9, further comprising a text entry device configured to capture the natural language communication, the natural language communication comprising at least one word entered by the user via the text entry device.

12. The computing device of claim 9, wherein the computing device receives a message from a remote computing device, the message comprising encrypted user information to be authenticated by the user, wherein the remote computing device is configured to provide a product or service to the user.

13. The computing device of claim 9, wherein the memory device stores instructions that, when executed by the processor, cause the computing device to:
receive, from at least a portion of the personal information assistant computing platform, a message comprising private user information to be verified by the user, wherein the message is sent in response to a request for information to be sent to a remote computing device;
generate, for display, a user interface screen comprising a plurality of fields, each corresponding to a data element of the private user information;
receive input confirming validity of the private user information; and
transmit a message to the at least a portion of the personal information assistant computing platform validating the information and causing the at least a portion of the personal information assistant computing platform to communicate the information to the remote computing device in response to the input confirming the validity of the private user information.

14. The computing device of claim 13, wherein the memory device stores instructions that, when executed by the processor, cause the computing device to:
receive a modification of a data element stored in at least one of the plurality of fields shown on the user interface screen;
communicate, via a network, a message to the at least a portion of the personal information assistant computing platform that includes the modification of the data element in response to receiving the modification; and
store, in a data store associated with the user, the modification of the data element.

15. The computing device of claim 13, wherein the memory device stores instructions that, when executed by the processor, cause the computing device to:
receive a request in a natural language communication from the user for the data element that was modified by the user; and
generate, for display, a user interface screen showing the data element as modified, wherein a data element modification is immediately available to the user upon storage in a data store.

16. A method comprising:
- configuring a personal information assistant computing platform at least partially executing on a computing device based on user-specific information;
- receiving, by the personal information assistant computing platform, an action request and one or more parameters associated with the action request from a user;
- analyzing, by the personal information assistant computing platform, the action request and the one or more parameters associated with the action request to determine a computer-assisted task to be performed in response to the action request;
- based on determining the computer-assisted task to be performed, generating, by an adaptive learning engine of the personal information assistant computing platform, a first personal information assistant from a plurality of personal information assistant templates corresponding to different types of functionalities and different user-specific information, wherein the first personal information assistant is generated based on the user-specific information and the action request; and
- transmitting, via a network interface, a personal information assistant message to a remote computing system, wherein the personal information assistant message is automatically generated by the personal information assistant in performance of the computer-assisted task.

17. The method of claim 16, comprising:
- receiving, via a natural language interface, a request from the user to display selected user information;
- requesting, via a secure network connection, the selected user information from an encrypted data store, wherein the encrypted data store is at a different geographic location from the user; and
- displaying, on a user interface screen, the selected user information when received from the data store, wherein the information is decrypted before display.

18. The method of claim 16, wherein the computer-assisted task comprises an electronic request for insurance coverage.

19. The method of claim 18, wherein the remote computing system comprises a virtual task agent configured to perform as a proxy of a customer service representative in performance of the computer-assisted task.

20. The method of claim 16, wherein receiving the one or more parameters associated with the action request includes receiving one or more action parameter thresholds associated with execution or completion of the action request.

* * * * *